United States Patent [19]
Edwards

[11] Patent Number: 5,735,534
[45] Date of Patent: Apr. 7, 1998

[54] EASILY REPLACEABLE TOP JAW FOR A CHUCK

[76] Inventor: Wayne Edwards, 9555 Williamsville Rd., Mechanicsville, Va. 23111-5444

[21] Appl. No.: 752,289

[22] Filed: Nov. 19, 1996

[51] Int. Cl.⁶ .................................................. B23B 31/16
[52] U.S. Cl. ........................ 279/124; 279/123; 279/153
[58] Field of Search ................................ 279/123, 124, 279/152, 153, 110

[56] References Cited

U.S. PATENT DOCUMENTS

| | | | |
|---|---|---|---|
| 3,190,666 | 6/1965 | Herbkersman | 279/122 |
| 3,281,158 | 10/1966 | Gibbons | 279/121 |
| 3,433,491 | 3/1969 | Longuski et al. | 279/2 |
| 4,667,972 | 5/1987 | Hiestand | 279/123 |
| 4,706,973 | 11/1987 | Covarrubias et al. | 279/153 |
| 4,763,906 | 8/1988 | Barbieux | 279/123 |
| 4,946,177 | 8/1990 | Barbieux | 279/123 |
| 5,190,300 | 3/1993 | Jaggers | 279/124 |
| 5,330,205 | 7/1994 | Norton | 279/124 |
| 5,464,232 | 11/1995 | Chizmadia | 279/124 |
| 5,529,320 | 6/1996 | Roberts et al. | 279/124 |

*Primary Examiner*—Steven C. Bishop
*Attorney, Agent, or Firm*—Norman B. Rainer

[57] ABSTRACT

A top jaw assembly for mounting upon the master jaw of a chuck for a lathe includes a mounting base and a top jaw. The mounting base contains two bores which facilitate securement to the master jaw, and a threaded hole. The top jaw is secured to the mounting base by way of a bolt that engages the threaded hole in the mounting base. Movement of the top jaw is prevented by slidably interengaged axial and transverse structure.

9 Claims, 4 Drawing Sheets

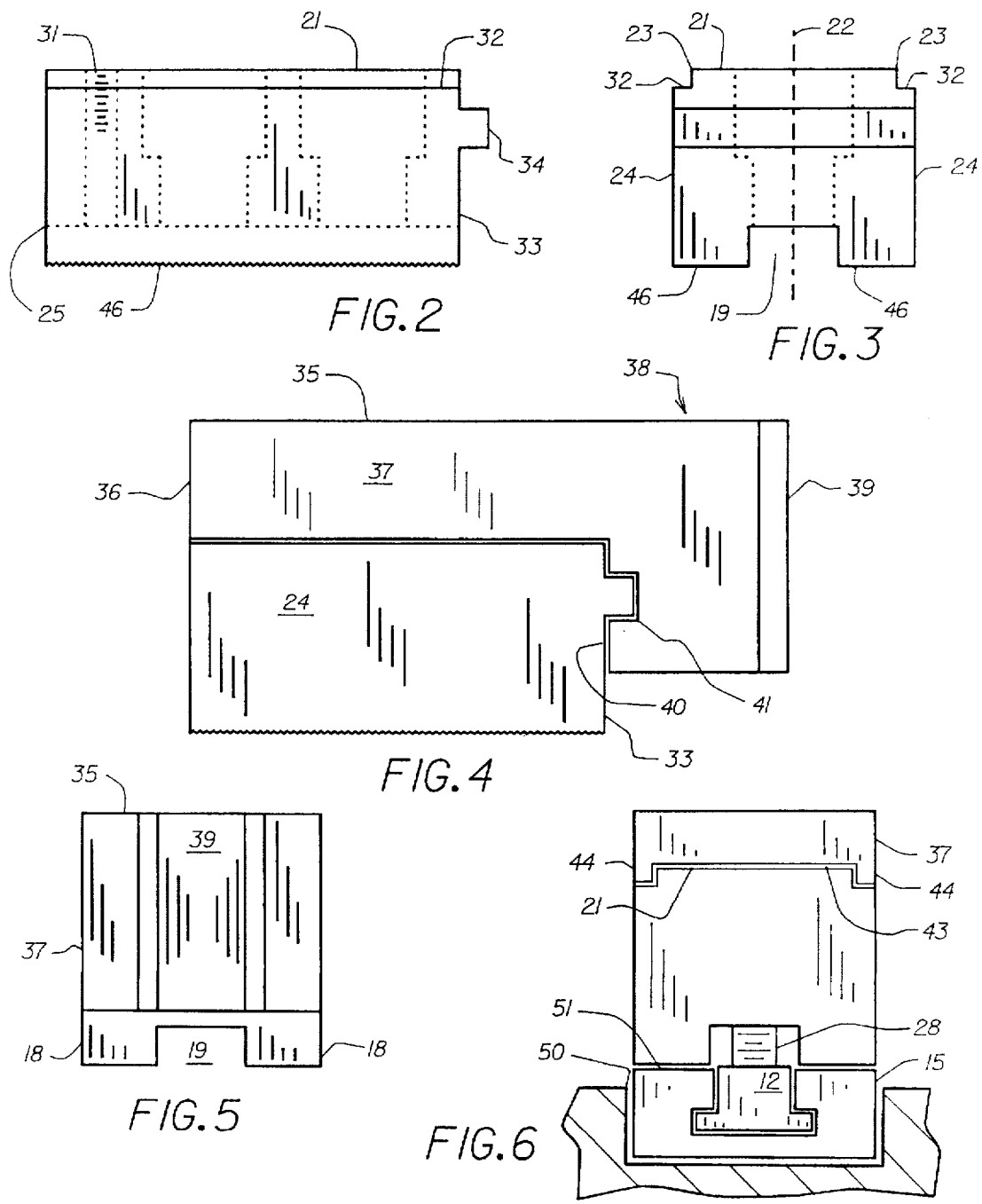

EASILY REPLACEABLE TOP JAW FOR A CHUCK

BACKGROUND OF THE INVENTION

1. Field of the Invention

The instant invention relates generally to top jaws for use on chucks on lathes, and more particularly concerns top jaws which can be easily and rapidly interchanged without removing the means by which the top jaw is attached to the chuck.

2. Description of the Prior Art

In the art, chucks on computer controlled or manual lathes typically have channels disposed on their outer surface, said channels extending radially outward from the center of the chuck. Master jaws are located in the channels and are attached to hydraulic means for moving the master jaws along the channels. The master jaws typically have inverted T-shaped channels extending along their lengths for receiving and securing jaw nuts which are in turn utilized to secure top jaws, sometimes referred to as "soft jaws."

The jaw nut corresponds in shape to the inverted T-shaped channel of the master jaw, and is slid along the master jaw to a desired position on the chuck. The top jaw is typically placed on the top surface of the jaw nut above the plane of the outer surface of the chuck. The top jaw is generally an elongated structure having an axis of elongation that orthogonally intersects the rotational axis of the chuck. Removable bolts extend downward through the top jaw into threaded recesses in the jaw nut. Upon tightening the bolts, the top jaw is drawn downward into contact with the serrated top surface of the master jaw while the jaw nut is drawn upward into contact with said channel in the master jaw. This process locks the top jaw in position on the master jaw.

In order to replace the prior art top jaws, these bolts generally are removed, allowing the top jaw to be pulled away from engagement with the jaw nut and master jaw. A new top jaw is positioned above the jaw nut, and bolts are passed through the top jaw into contact with the threaded recesses in the jaw nut. The bolts are tightened, drawing the top jaw into contact with the serrated upper surface of the master jaw and the jaw nut into contact with the T-shaped channel.

The alignment and re-threading of the bolts through the top jaw into the jaw nut requires considerable precise manipulation while retaining the slideably adjustable position of the jaw nut. For this reason, the changing of a top jaw may be time consuming and very difficult. It is, therefore, to the effective resolution of the aforementioned problems and shortcomings that the present invention is directed.

A quickly interchangeable top jaw construction is disclosed in U.S. Pat. No. 5,190,300 to Jaggers wherein a mounting base having a wedge portion is caused to engage a top jaw by way of a pin that penetrates aligned channels in both the base and top jaw. Although fast interchangeability is achieved, the sturdiness of the top jaw is compromised, particularly with respect to yawing movement relative to the axis of rotation of the chuck. Such yawing movement may be defined as movement in a path centered upon a plane that includes said chuck axis, said path including the proper orientation of the top jaw, namely orthogonal to said chuck axis.

It is accordingly a primary object of the present invention to provide a top jaw assembly that permits easy engagement with the master jaw of a chuck.

It is a further object of this invention to provide a top jaw assembly as in the foregoing object which prevents yawing movement of the top jaw.

It is another object of the present invention to provide an assembly of the aforesaid nature which is of rugged, durable construction amenable to low cost manufacture.

These objects and other objects and advantages of the invention will be apparent from the following description.

SUMMARY OF THE INVENTION

The above and other beneficial objects and advantages are accomplished in accordance with the present invention by a top jaw assembly configured to be installed upon a serrated surface of a master jaw of a chuck having a planar outer surface and T-shaped channels that each slideably retain a jaw nut having threaded recesses directed orthogonally toward said outer surface, said assembly comprising:

1) a mounting base of monolithic construction having:
   a) a bifurcated lower extremity having two opposed coplanar tracks of aligned serrations defining therebetween a straight receiving slot,
   b) a flat upper extremity of rectangular shape elongated upon a plane of symmetry that characterizes said assembly and having opposed parallel straight long side edges, said upper extremity being disposed in parallel relationship to the plane of said lower extremity,
   c) paired spaced apart parallel side surfaces,
   d) first and second bores centered upon said plane of symmetry and extending perpendicularly between said upper extremity and receiving slot, and configured to accommodate passage of bolts that engage the threaded recesses of said jaw nut,
   e) a threaded hole centered upon said plane of symmetry and directed perpendicularly between said upper extremity and receiving slot,
   f) first axial locking means associated with said long side edges, and
   g) a substantially flat forward surface having first transverse locking means, and 2) a top jaw of monolithic construction configured to releasibly engage said mounting base, and having:
   a) a top face and opposed side faces,
   b) a front portion bounded in part by said side and top faces and further defined by a leading extremity having a workpiece-adapted profile, and a substantially flat trailing extremity configured to abut with the forward surface of said mounting base, said trailing extremity having second transverse locking means configured to engage said first transverse locking means,
   c) a rear portion having a lower face located above said recessed slot and configured to slidingly abut the upper extremity of said mounting base, and second axial locking means configured to slidingly engage said first axial locking means, and
   d) a mounting bore extending between said top and lower faces and positioned so as to align with the threaded hole of said mounting base when said mounting base is in engagement with said top jaw.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 2 is a side view of the mounting base component of the assembly of FIG. 1.

FIG. 3 is a front view of the mounting base component.

FIG. 4 is a side view of the assembly of FIG. 1.

FIG. 5 is a front view of the assembly of FIG. 4.

FIG. 6 is a rear elevational view of the assembly in functional position on a master jaw attached to a chuck.

Figure 1:
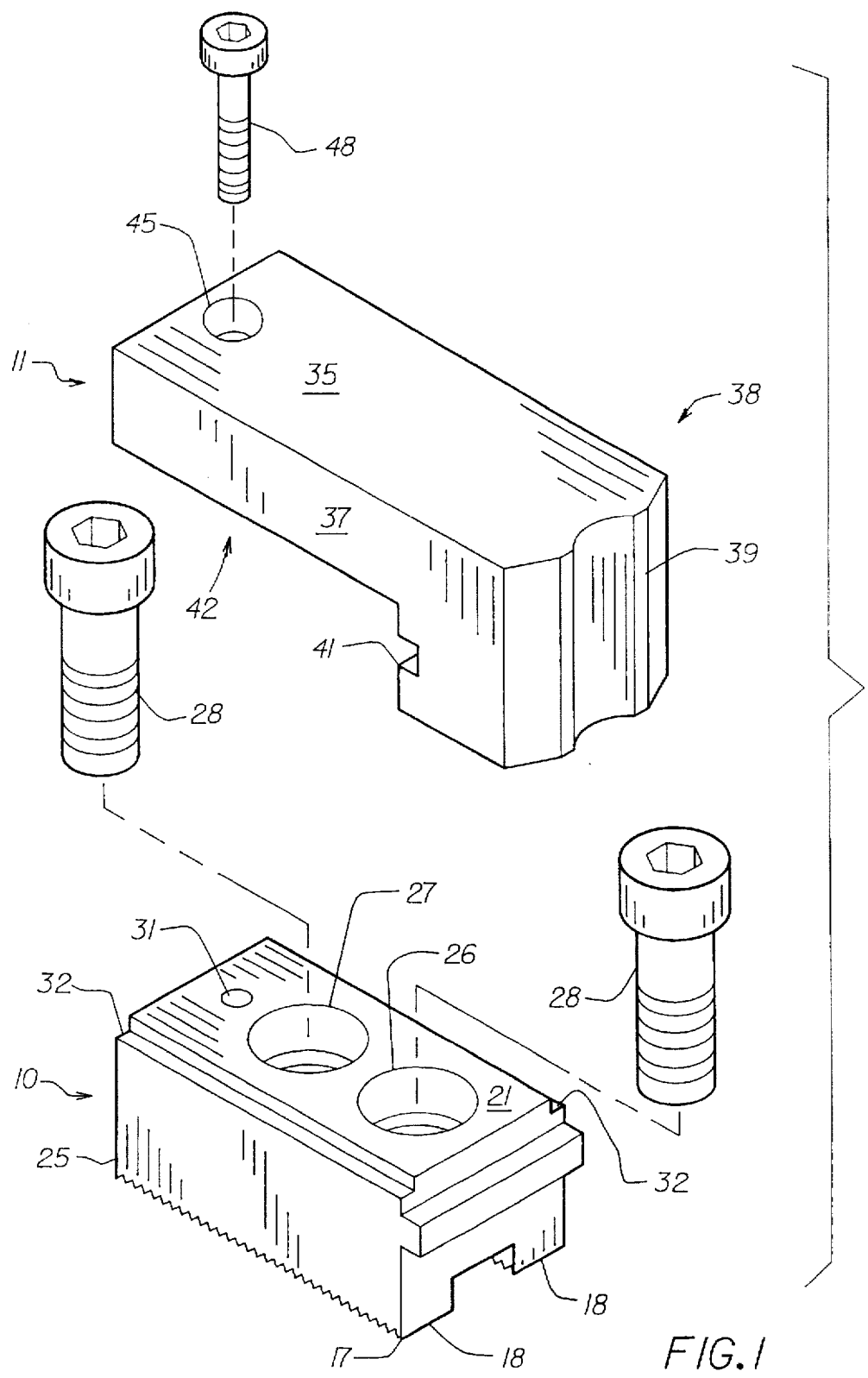
FIG. 1 is an exploded top and side perspective view of an embodiment of the top jaw assembly of the present invention.

The terms "front", "rear", "upper" and "lower" and expressions of similar import have reference to the center axis of a chuck upon which the assembly of this invention is installed. Such terms are employed for convenience only, it being understood that the chuck may be employed in any directional mode.

DESCRIPTION OF THE PREFERRED EMBODIMENT

Referring now to FIGS. 1–9, an embodiment of the top jaw assembly 53 of the present invention is shown comprised of mounting base 10 and top jaw 11, each of monolithic construction.

Base 10 is configured to be mounted to a conventional jaw nut 12, as will be more fully described below. A protruding flange 13 is integrally formed with said jaw nut. The jaw nut is shaped as is common in the art to be slideably engaged by the inverted "T"-shaped channel 14 in the master jaw 15 of a chuck 16 (FIG. 6). The jaw nut further possesses threaded recesses 30 directed outwardly from the chuck. Such master jaw, having serrations on its upper surface 51, is recessed into a groove 50 in chuck 16 which slideably positions said master jaw, preventing side to side movement within the chuck.

Mounting base 10 has a bifurcated lower extremity 17 having two opposed coplanar tracks 18 of aligned serrations 46 defining therebetween a straight receiving slot 19. The serrations are configured to mate with the standard serrations disposed upon upper surface 51 of master jaw 15. Said mounting base is further bounded by flat upper extremity 21 of rectangular shape elongated upon a plane of symmetry 22 that characterizes said assembly, said upper extremity having opposed parallel straight long side edges 23. Upper extremity 21 is disposed in parallel spaced apart relationship with respect to the plane of said lower extremity.

Mounting base 10 is further defined by paired parallel flat side surfaces 24 and a flat rear surface 25 orthogonally disposed to said side surfaces.

First and second bores, 26 and 27, respectively, are centered upon said plane of symmetry and extend perpendicularly between said upper extremity and receiving slot 19. Said bores are configured to accommodate passage of removable mounting bolts 28 of conventional design which engage the threaded recesses 30 of the jaw nut.

A threaded hole 31 is centered upon said plane of symmetry and directed perpendicularly between said upper extremity and receiving slot. Hole 31, in the exemplified embodiment, is located between rear surface 25 and second bore 27.

First axial locking means in the form of paired shoulder recesses 32 are associated with said long side edges 23.

The mounting base is further defined by a substantially flat forward surface 33 having first transverse locking means in the form of a forwardly protruding locking ridge 34 extending between side surfaces 24 in parallel relationship to said upper extremity.

Top jaw 11 is configured to releasibly engage said mounting base, and is bounded in part by top and rear faces 35 and 36, respectively, and opposed side faces 37. Top jaw 11 is further characterized in having a front portion 38 bounded in part by said side and top faces and further defined by a leading extremity 39 having a profile adapted to grip a workpiece, whether by inward or outward movement of the jaws. A substantially flat trailing extremity 40 is disposed in opposition to said leading extremity in front portion 38, and is configured to abut with the forward surface 33 of said mounting base. Second transverse locking means in the form of recessed slot 41 is disposed within trailing extremity 40 and configured to receive locking ridge 34 of said mounting base.

Top jaw 11 is further comprised of a rear portion 42 having a lower face 43 located above recessed slot 41 and configured to slidingly abut upper extremity 21 of said mounting base. Second axial locking means in the form of downwardly directed paired rails 44 embrace lower face 43 and are configured to slidingly engage the paired shoulder recesses 32 of said mounting base. A mounting bore 45 extends between top face 35 and lower face 43 and is positioned so as to align with the threaded hole 31 of said mounting base when said mounting base is in engagement with said top jaw.

In operation, the mounting base is positioned atop the master jaw of the chuck in a manner so that the serrations of the master jaw face the matching serrations 46 within paired tracks 18 of the mounting base. Mounting bolts 28 of conventional design are then entered through said first and second recessed smooth bores 26 and 27 to engage the threaded recesses 30 in jaw nut 12. The tightening of bolts 28 draws the mounting base and jaw nut together to securely embrace master jaw 15 (FIG. 6).

Figure 9:
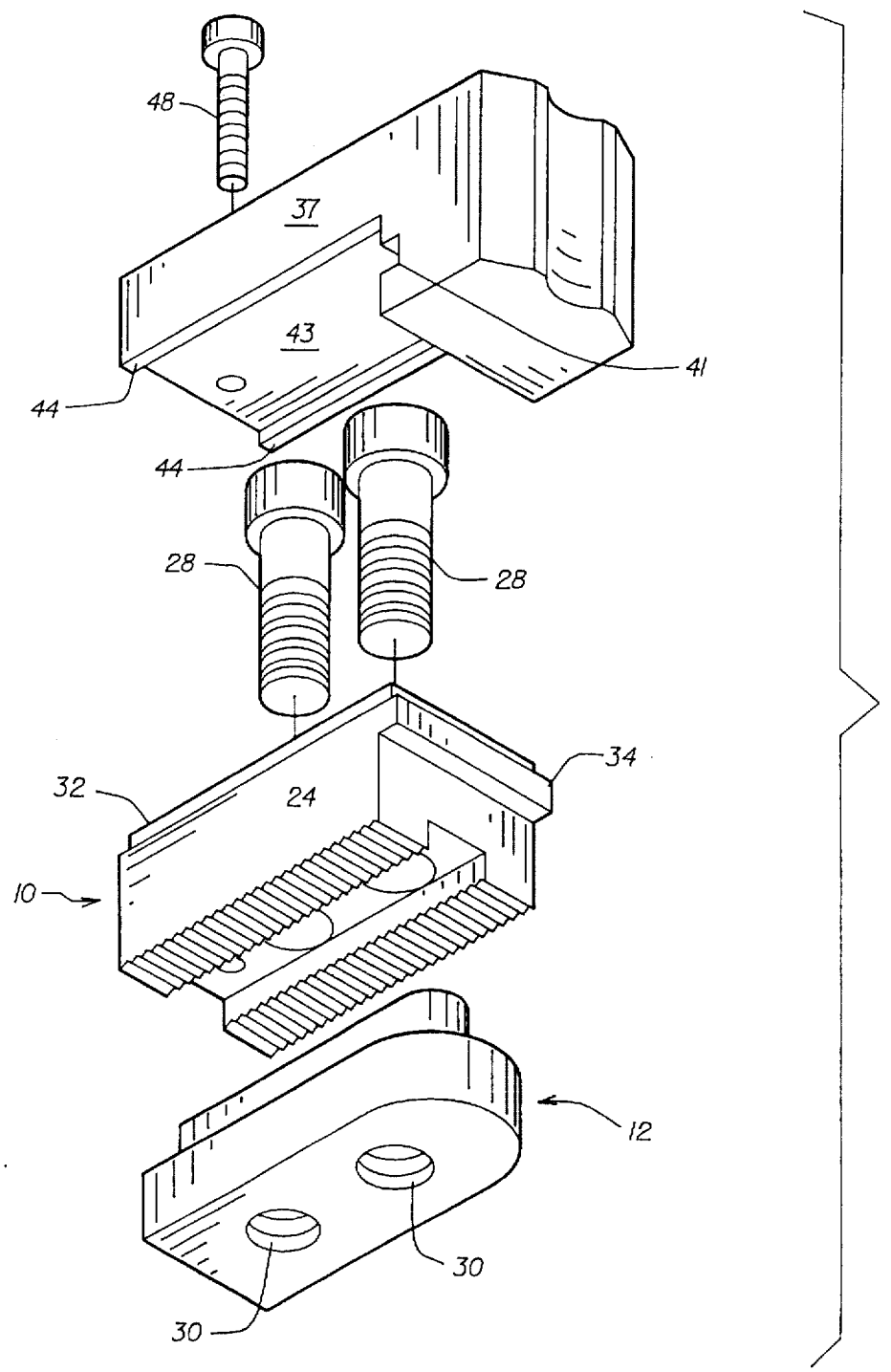
FIG. 9 is an exploded bottom and side perspective view similar to FIG. 1, but from below.

Once the mounting base is secured to jaw nut 12, top jaw 11 is caused to slidingly engage the mounting base, as shown in FIGS. 4 and 9, such that: a) rails 44 engage shoulder recesses 32; b) forward surface 33 of the mounting base is in abutment with trailing extremity 40 of said top jaw, causing locking ridge 34 to enter recessed slot 41; and c) mounting bore 45 is in alignment with threaded hole 31. When both components of the assembly are in such proper juxtaposition, a securing bolt 48 is employed to engage hole 31, thereby easily securing the assembly with respect to said master jaw. The effect of the interengagement of first and second axial locking means is to prevent movement of the assembly in a path parallel to the outer surface of the chuck. The effect of the interengagement of first and second transverse locking means is to prevent yawing movement of leading extremity 39 along the chuck axis.

Figure 7:
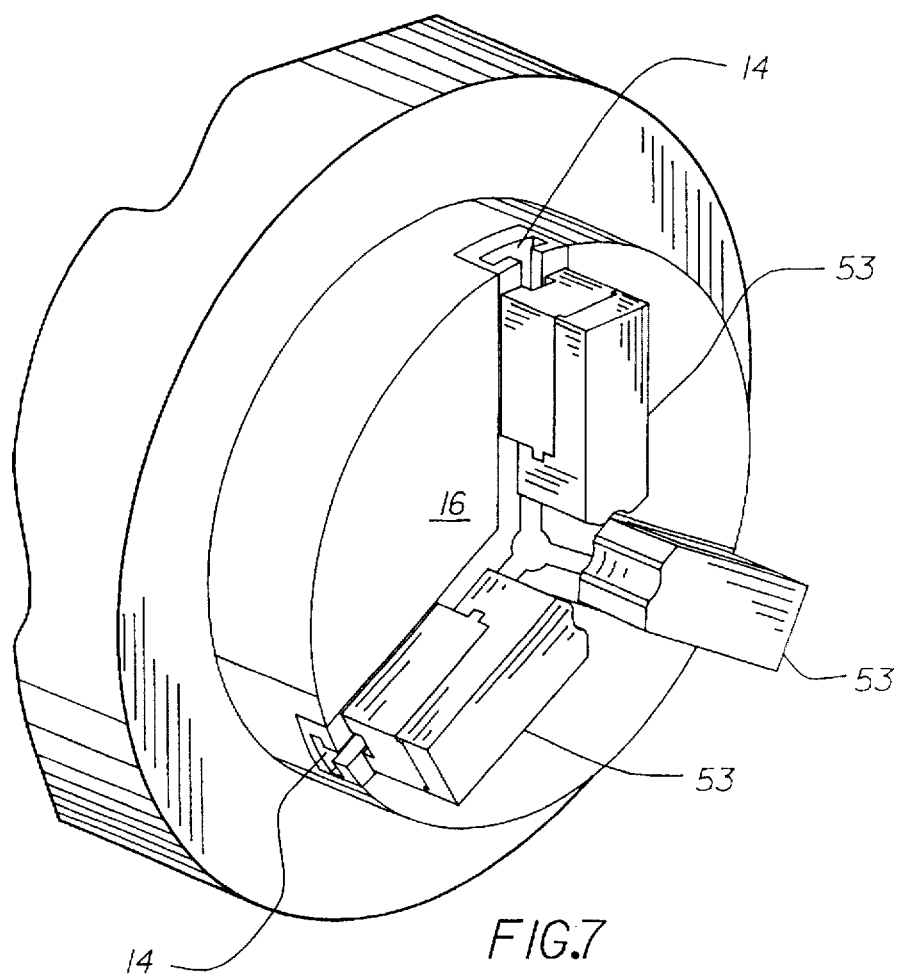
FIG. 7 is a perspective view of the assembly of this invention in position on a conventional chuck.
Figure 8:
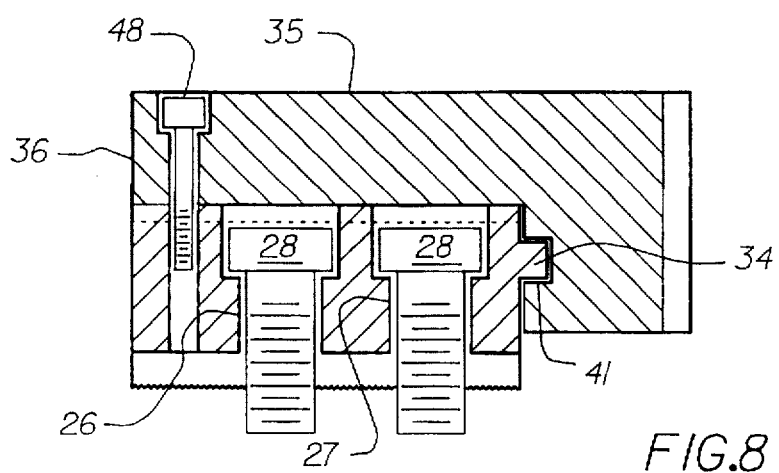
FIG. 8 is a cross-sectional view of the assembly.

As shown in FIG. 7, three jaw assemblies of this invention are utilized in a chuck, spaced 120 degrees apart. A top jaw assembly of the present invention would be mounted upon each master jaw in precisely matched spacing with respect to the rotational axis of the chuck. The top jaw assemblies shown in FIG. 7 are all directed toward the chuck axis in a manner to grip the exterior of a workpiece. However, for grasping the interior of pipes and the like, the assembly may be positioned such that leading extremities 39 are radially outwardly directed.

In preferred embodiments, the top jaw is fabricated of a softer metal than the mounting base. It is also preferred that both components have rear surfaces which are flat, and in coplanar disposition in the engaged condition of the assembly. It is further preferred that the side surfaces of the mounting base and side faces of the top jaw be flat, and in coplanar disposition in the engaged condition of the assembly.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described my invention, what is claimed is:

1. A top jaw assembly configured to be installed upon a serrated surface of a master jaw of a lathe chuck having a planar outer surface and T-shaped channels that each slideably retain a jaw nut having threaded recesses directed orthogonally toward said outer surface, said assembly comprising:

a) a mounting base of monolithic construction having:

i) a bifurcated lower extremity having two opposed coplanar tracks of aligned serrations defining therebetween a straight receiving slot, ii) a flat upper extremity of rectangular shape elongated upon a plane of symmetry that characterizes said assembly and having opposed parallel straight long side edges, said upper extremity being disposed in parallel relationship to the plane of said lower extremity, iii) paired spaced apart parallel side surfaces, iv) first and second bores centered upon said plane of symmetry and extending perpendicularly between said upper extremity and receiving slot, and configured to accommodate passage of bolts that engage the threaded recesses of said jaw nut, v) a threaded hole centered upon said plane of symmetry and directed perpendicularly between said upper extremity and receiving slot, vi) first axial locking means associated with said long side edges, and vii) a substantially flat forward surface having first transverse locking means, and b) a top jaw of monolithic construction configured to releasibly engage said mounting base, and having:

i) a top face and opposed side faces, ii) a front portion bounded in part by said side and top faces and further defined by a leading extremity having a workpiece-adapted profile, and a substantially flat trailing extremity configured to abut with the forward surface of said mounting base, said trailing extremity having second transverse locking means configured to engage said first transverse locking means, iii) a rear portion having a lower face located above said recessed slot and configured to slidingly abut the upper extremity of said mounting base, and second axial locking means configured to slidingly engage said first axial locking means, and iv) a mounting bore extending between said top and lower faces and positioned so as to align with the threaded hole of said mounting base when said mounting base is in engagement with said top jaw.

2. The top jaw assembly of claim 1 wherein said first axial locking means is comprised of paired shoulder recesses associated with the long side edges of said mounting base.

3. The top jaw assembly of claim 2 wherein said second axial locking means is comprised of paired rails which slidingly engage said paired shoulder recesses.

4. The top jaw assembly of claim 1 wherein said first transverse locking means is a ridge forwardly protruding from the forward surface of said mounting base.

5. The top jaw assembly of claim 4 wherein said second transverse locking means is a slot recessed into the trailing surface of the front portion of said top jaw.

6. The top jaw assembly of claim 1 wherein said top jaw is fabricated of a softer metal than said mounting base.

7. The top jaw assembly of claim 1 wherein the side surfaces of the mounting base and side faces of the top jaw are flat, and in coplanar disposition in the engaged condition of the assembly.

8. The top jaw assembly of claim 1 wherein both said mounting base and top jaw have flat rear surfaces which are in coplanar disposition in the engaged condition of the assembly.

9. The top jaw assembly of claim 1, wherein there are three of said top jaw assemblies, which are identical.

* * * * *